United States Patent [19]

Ozaki

[11] Patent Number: 4,667,778

[45] Date of Patent: May 26, 1987

[54] BICYCLE CALIPER BRAKE ASSEMBLY

[75] Inventor: Nobuo Ozaki, Sakai, Japan

[73] Assignee: Maeda Industries, Ltd., Osaka, Japan

[21] Appl. No.: 824,554

[22] Filed: Jan. 23, 1986

[30] Foreign Application Priority Data

Jan. 23, 1985 [JP] Japan .................................. 60-11702

[51] Int. Cl.$^4$ ................................................ B62L 1/02
[52] U.S. Cl. ................................ 188/24.12; 188/24.18
[58] Field of Search ............... 188/24.11, 24.12, 24.16, 188/24.18, 24.21, 24.22, 2 D, 26, 29

[56] References Cited

U.S. PATENT DOCUMENTS 3,141,525 7/1964 Lee ..................................... 188/24.11
4,258,831 3/1981 Weber .................................. 188/29 X

FOREIGN PATENT DOCUMENTS 0008812 3/1980 European Pat. Off. ......... 188/24.12
0012394 of 1894 United Kingdom ............. 188/24.11

Primary Examiner—George E. A. Halvosa
Assistant Examiner—Robert J. Oberleitner
Attorney, Agent, or Firm—Birch, Stewart, Kolasch & Birch

[57] ABSTRACT

A caliper brake assembly comprising a pair of pivotal caliper arms operatively connected to a remote brake lever via a double type control cable consisting of an inner cable and an outer cable, a brake shoe mounted to a lower end of each of the caliper arms, a return spring for urging each of the caliper arms to take its normal release position when the brake lever is in its rest position, the pair of caliper arms being arranged so as to bring the brake shoes into braking contact with the bicycle wheel when the brake lever is operated to pull the inner cable, wherein at least one of the pair of caliper arms has an auxiliary braking element adapted to automatically come into braking contact with the bicycle wheel when the inner cable is freed from tension.

3 Claims, 8 Drawing Figures

BICYCLE CALIPER BRAKE ASSEMBLY

BACKGROUND OF THE INVENTION

This invention relates to a bicycle caliper brake assembly, and more particularly to such brake assembly provided with an auxiliary braking element adapted to work automatically in the event of an emergency.

In general, a bicycle caliper brake assembly has a pair of opposed caliper arms arranged so as to pivotally move in the opposite directions. One typical type of such brake assembly is known as a side pull type while the other typical type thereof is known as a center pull type, as taught by Page 373 of the "JAPANESE INDUSTRIAL STANDARD, Classification and Symbols of a Bicycle, 1975" edited in English by the Japanese Industrial Standard Association.

An example of a typical prior art side pull type caliper brake assembly is illustrated in FIG. 8 of the accompanying drawings for the convenience of explanation of the structure and arrangement of the conventional assembly.

Referring now to FIG. 8, the bicycle caliper brake assembly comprises a pair of curved caliper arms, that is the first arm 2 and the second arm 3, which are pivotally supported on a common horizontal support shaft 1 which is to be fixed to a bicycle frame. The first arm 2 has a shoe support section 4 and a connecting section 4'.

The shoe support section 4 extends to the lower right of the shaft 1 and has a right brake shoe 7 mounted to the lower end thereof. The connecting section 4' extends to the lower left of the shaft 1 and is connected at its free end 4a to an inner cable w1 of a known double type control cable W by means of a clamp 15. As is well known, the control cable W is connected at its non-illustrated remote end to a known brake lever (not shown).

The second arm 3 also has a shoe support section 5 and a connecting section 5'. The shoe support section 5 extends to the lower left of the shaft 1 and has a left brake shoe 8 mounted to the lower end thereof. The connecting section 5' extends to the upper left of the shaft 1 and is connected at its free end 5a to an outer cable w2 of the control cable W via an externally threaded sleeve 13 fixed to the lower end of the outer cable w2. The threaded sleeve 13 extends downward through a bore formed in the arm end 5a which is repositionable up and down on the sleeve 13.

An adjusting nut 14 is mounted on the threaded sleeve 13 to restrict the upward displacement of the arm end 5a to provide a selected vertical distance between the arm ends 5a, 4a.

The caliper brake assembly is normally held in its release position by means of a return spring 6 which has a central fixed portion 6a supported by the shaft 1 and a pair of resilient side legs 6b, 6c each extending downwardly from the central portion 6a and fixed at its lower end to the shoe support section 4, 5, respectively, Thus, the pair of caliper arms 2, 3 are always urged outwards by the return spring 6 but restricted from excessive outward displacement by the control cable W so that the brake shoes 7, 8 are properly spaced away from a bicycle wheel rim when the brake lever is in its rest position.

On the other hand, when the brake lever is operated to pull the cable w1, the vertical distance between the arm ends 5a, 4a is forcibly reduced to bring the arms 2, 3 into pivotal motion about the shaft 1 to bring the opposed brake shoes 7, 8 into braking contact with the bicycle wheel rim.

As will be apparent from the foregoing description, the conventional caliper brake assembly is not provided with any auxiliary braking means which works in the event of an emergency. For instance, when the inner cable w1 is unexpectedly broken or disengaged at its one end from the arm end 4a or at its remote end from the brake lever during cycling, the brake assembly does not work and, therefore, the cyclist finds it difficult to stop his bicycle. Such trouble in the brake assembly may cause a serious accident in a particular case.

It is, therefore, an object of the invention to provide an improved caliper brake assembly having an auxiliary braking element which works automatically in the event of an emergency.

SUMMARY OF THE INVENTION

An object of the present invention is to provide a caliper brake assembly which comprises a pair of pivotal caliper arms operatively connected to a remote brake lever by means of a double type control cable including an inner cable and an outer cable, each of the caliper arms having a brake shoe mounted at its lower end, a return spring for urging each of the caliper arms to take its normal release position when the brake lever is in its rest position, the pair of caliper arms being arranged so as to bring the brake shoes into braking contact with the bicycle wheel when the brake lever is operated to pull the inner cable, wherein at least one of the pair of caliper arms has an auxiliary braking element adapted to automatically come into braking contact with the bicycle wheel when the inner cable is freed from tension.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS:

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 6:
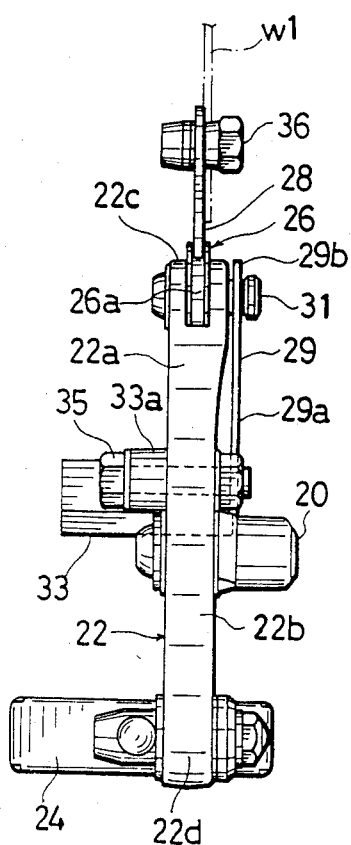
FIG. 6 is a left side elevation of the caliper brake assembly of FIG. 5.
Figure 7:
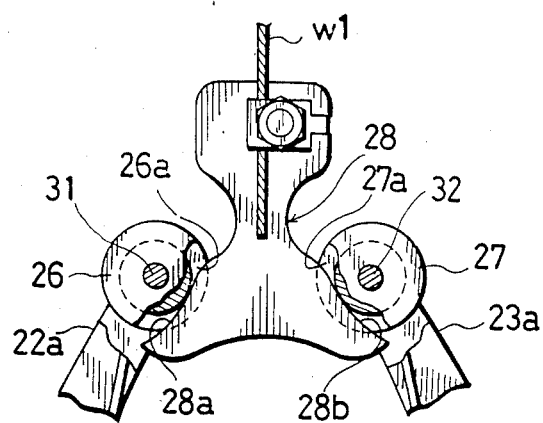
FIG. 7 is a front elevation showing a cam plate with its pair of cam driver portions engaged with a pair of cam followers in the form of grooved pulleys.
Figure 8:
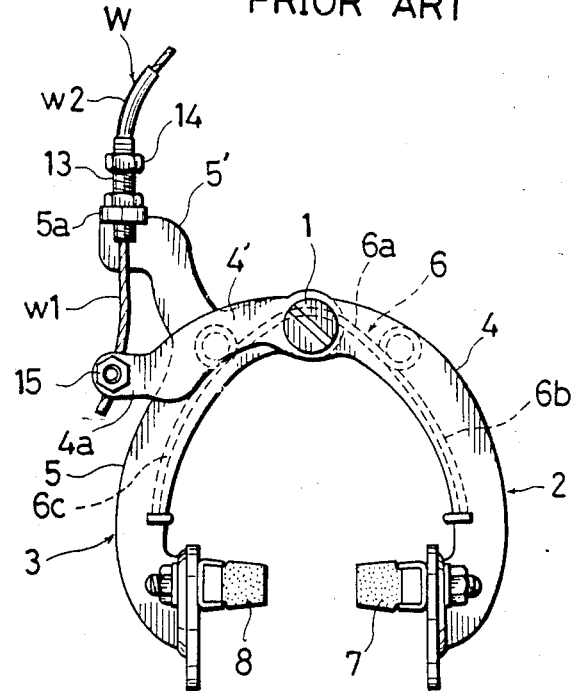
FIG. 8 is a fragmentary front elevation of a prior art side pull type caliper brake assembly.

Referring now to the accompanying drawings, identical reference numerals and characters are used to indicate various structural elements which are identical or substantially identical in function throughout FIGS. 1 to 7. Reference numerals and characters used in FIG. 8 are also used in FIGS. 1 thru 7 to indicate various known structural elements substantially identical in function to those incorporated in the prior art brake assembly of FIG. 8. Defining words "right" and "left" are used in FIGS. 1 thru 8 in the sense that any element or portion defined by such word is located to the right or left when viewed from a front side of a bicycle equipped with the caliper brake assembly of the present invention.

In FIGS. 1 to 4, there is illustrated a side pull type bicycle caliper brake assembly of the present invention which has a pair of caliper arms hereinafter referred to as a first arm 2 and second arm 3 which are pivotally supported by a horizontal support shaft 1 in the form of a hinge bolt fixed to a fork crown 9 of a bicycle frame. The shaft 1 serves a fulcrum common to both of the arms 2, 3.

The first arm 2 has a curved, shoe support section 4 and a connecting section 4'. The shoe support section 4 extends to the lower right of the shaft 1 to substantially surround a right half of a front wheel FW. An inwardly directed brake shoe 7 is mounted to the free end of the section 4 so as to act upon a right side wall of a wheel rim R. The connecting section 4' extends to the lower left of the shaft 1 and is connected at its end 4a to an inner cable w1 of a known double type control cable W by means of a clamp 15. The control cable W is connected at its non-illustrated remote end to a known brake lever (not shown) and the inner cable w1 extends in tension between the arm end 4a and the brake lever.

The second arm 3 also has a curved, shoe support section 5 and a connecting section 5'. The shoe support section 5 extends to the lower left of the shaft 1 to substantially surround a left half of the wheel FW. An inwardly directed brake shoe 8 is mounted to the free end of the section 5 so as to act upon a left side wall of the rim R, conventionally. The connecting section 5' branches off from the section 5 to the upper left thereof and is connected at its free end 5a to an outer cable w2 of the double cable W via a known threaded sleeve 13 fixed to the lower end of the outer cable w2. The threaded sleeve 13 extends downwards through a bore formed in the arm end 5a which is repositionable up and down on the sleeve 13. An adjusting nut 14 is mounted on the threaded sleeve 13 to restrict the upward displacement of the arm end 5a to provide a selected distance between the arm ends 5a, 4a.

The caliper brake assembly is normally held in its release position by means of a return spring 6 formed of a spring wire. The spring 6 has a central fixed portion 6a supported by the shaft 1 and a pair of resilient side legs 6b, 6c each extending downwardly from the central portion 6a and fixed at its lower end to the shoe support section 4, 5, respectively, This may be realized, for example, by engaging each of the leg ends with a cross pin 10 or its equivalent which is rigid to or integral with the shoe support sections 4, 5 and preferably located adjacent the brake shoe 7, 8, respectively.

Thus, the pair of caliper arms 2, 3 are always urged outwards by the return spring 6, but restricted from excessive outward displacement by the control cable W so that the brake shoes 7, 8 are properly spaced away from the side walls of the rim R when by the caliper brake assembly is in its normal release position.

The above described structure and arrangement of the side pull type caliper brake assembly are known. The features of the present invention reside in the following specific construction and arrangement of the assembly.

According to the invention, the first caliper arm 2 has a first auxiliary braking element 11 adapted to automatically act upon a tire surface T of the wheel FW at emergency. The braking element 11 can be realized in various ways. In the illustrated example, the element 11 is in the form of an inward projection from the connecting section 4', having a support portion 11a and an integral shoe portion 11b. The support portion 11a may preferably extend radially inwardly toward the tire surface T. The shoe portion 11b has a cylindrical inward surface extending in parallel with the tire surface T, with a certain adjusted clearance therebetween when in a normal condition.

The second caliper arm 3 has a curved, extended section 3a in addition to the section 5, 5'. This additional section 3a extends to the lower right of the shaft 1 along the support section 4 of the first arm 2. The second caliper arm 3 also has a second auxiliary braking element 12 adapted to automatically act upon the tire surface T as well. In the illustrated example, the element 12 is in the form of an inward projection from the extended section 3a, having a support portion 12a and an integral shoe portion 12b. The support portion 12a extends radially inwardly toward the tire surface T. The shoe portion 12b has also a cylindrical inward surface extending in parallel with the tire surface T with a certain adjusted clearance therebetween when in a normal condition.

Each of the cylindrical inward surfaces of the shoe portions 11b, 12b has a sufficient area to provide an effective frictional engagement with the tire surface T when in operation. The inward surface may preferably be a rough surface for better frictional engagement with the tire surface T. If desired, the inward surface may be covered with a rubber layer (not shown) for the same purpose.

Figure 1:
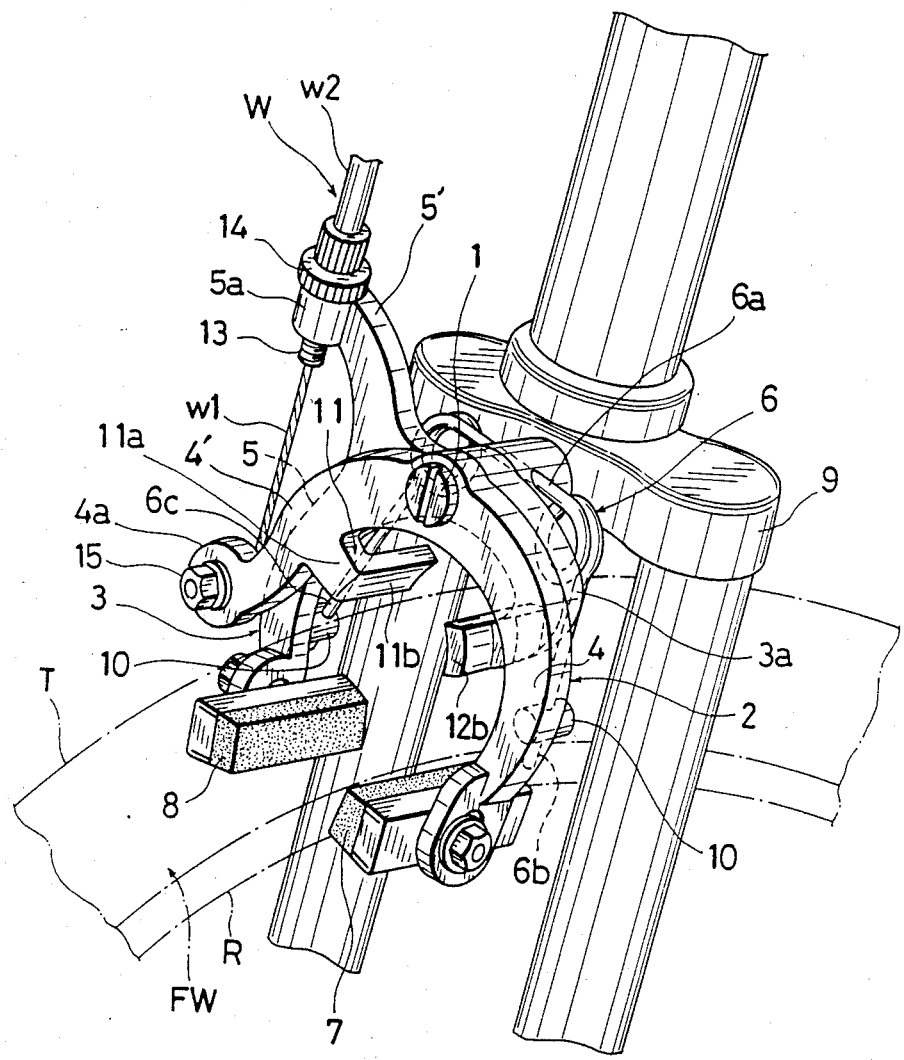
FIG. 1 is a perspective view of a side pull type caliper brake assembly embodying the present invention as mounted on a bicycle.
Figure 2:
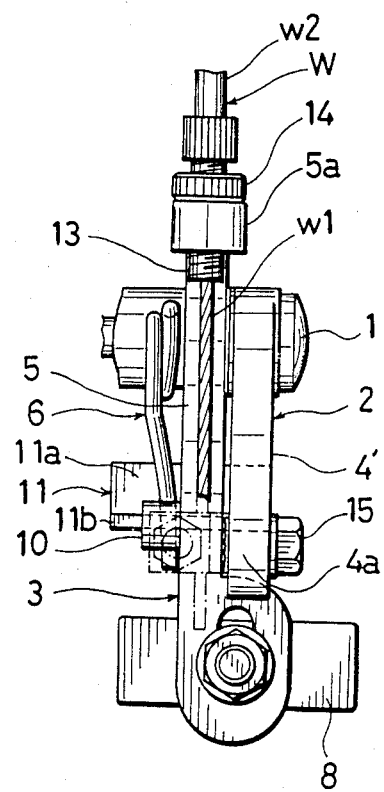
FIG. 2 is a left side elevation of the brake assembly of FIG. 1.
Figure 3:
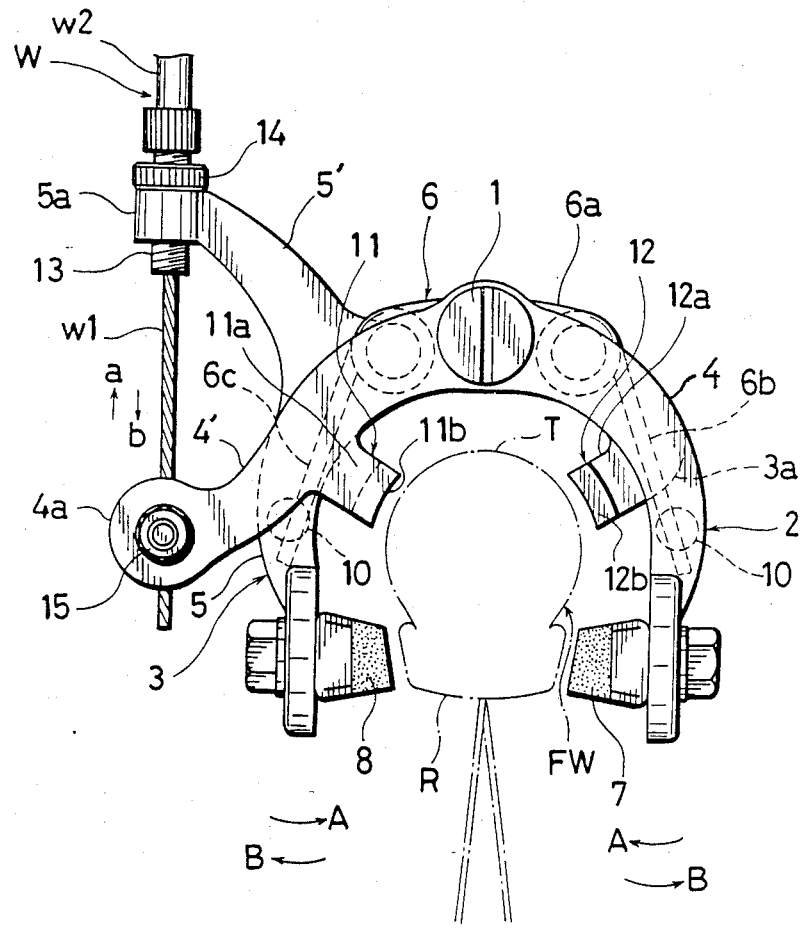
FIG. 3 is a front elevation showing the brake assembly in a normal release position.

In operation, when the caliper brake assembly is in its normal or release position, the brake shoes 7, 8 are spaced away from the side walls of the rim R while the auxiliary braking elements 11, 12 are also spaced away from the tire surface T as long as a vertical distance between the arm ends 4a, 5a of the first and the second arms 2, 3 is properly maintained, as illustrated in FIG. 3. The vertical distance can be properly adjusted by means of the adjusting nut 14.

When the brake lever is operated to pull the inner cable w1 in the direction of an arrow a, the vertical distance between the arm ends 4a, 5a is forcibly reduced to bring the arms 2, 3 into pivotal motion about the shaft 1, resulting in that the brake shoes 7, 8 are forced to move in the directions of arrows A into braking contact with the side walls of the rim R, as shown in FIG. 3.

On the other hand, when the brake lever is operated so that the cable w1 is loosened in the direction of an arrow b, the brake assembly is restored into its described release position by the return spring 6, as also shown in FIG. 3.

Figure 4:
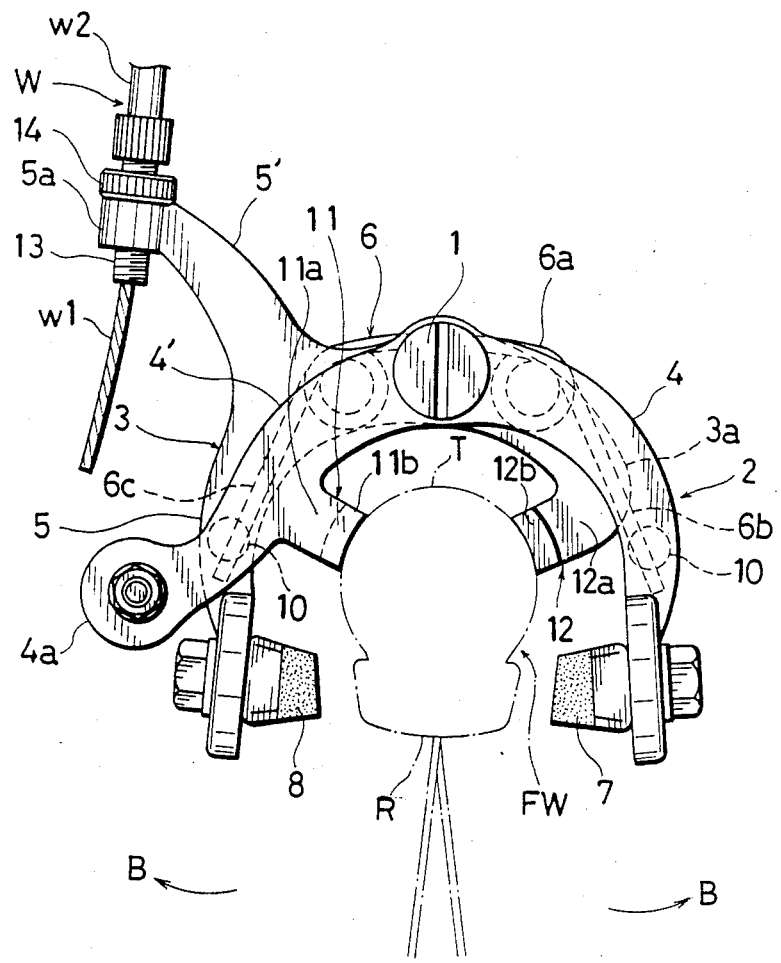
FIG. 4 is a similar view to FIG. 3 but showing the brake assembly in an emergency braking position.

When the inner cable w1 is completely freed from tension because of an unexpected breakage or disengagement at its one end from the arm end 4a or at its remote end from the brake lever, the return spring 6 urges the arms 2, 3 to pivotally move above the shaft 1 in the direction of the arrows B as illustrated in FIG. 4, with the result that the distance between the arm ends 4a, 5a is forcibly increased to the maximum extent beyond the preadjusted extent. Consequently, the first arm 2 is forced to turn counterclockwise to bring the braking element 11 into pressing contact against the tire surface T while the second arm 3 is forced to turn clockwise to bring the braking element 12 into pressing contact against the tire surface T. Thus, an automatic braking at emergency can be effected.

Figure 5:
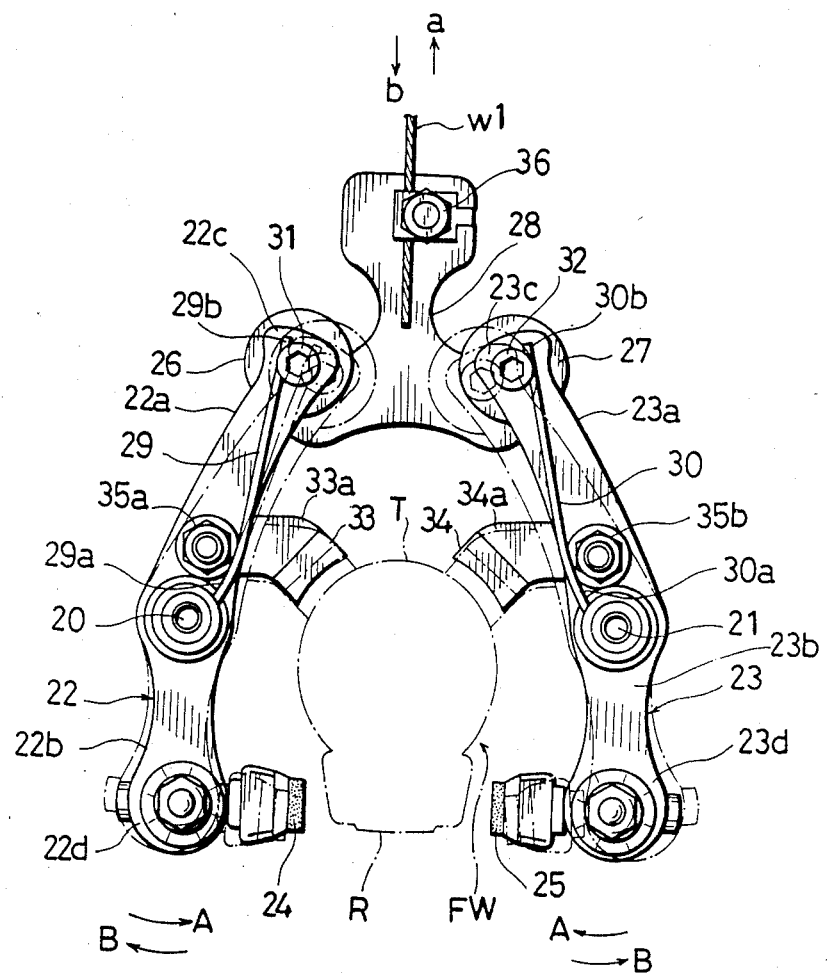
FIG. 5 is a front elevation showing a center pull type caliper brake assembly embodying the present invention.

FIGS. 5 and 6 illustrate a center pull type caliper brake assembly of the present invention, which has a pair of caliper arms hereinafter referred to as a first arm 22 and a second arm 23. The first arm 22 is pivotally supported at its mid portion by a first horizontal support shaft 20 carried by a bicycle frame, conventionally. The second arm 23 is also pivotally supported at its mid portion by a second horizontal support shaft 21 fixed to the bicycle frame. The support shafts 20, 21 serve as fulcrums.

The first arm 22 has a connecting section 22a extending to the upper right of the first shaft 20. A first pulley 26, which has a circumferential groove 26a and serves as a cam follower, is mounted to the upper end 22c of the section 22a so as to rotate about a pin 31 supported by the upper end 22c. The grooved pulley 26 is in cooperative contact with a left driver portion 28a of a cam plate 28 connected to the control cable w1 by means of a clamp 36, as best shown in FIG. 7.

The first arm 22 further has a shoe support section 22b extending downwards from the first shaft 20. A left brake shoe 24 is mounted to the free end 22d of the section 22b so as to act upon the rim R for braking.

A first return spring 29 is mounted on the first arm 22, with its upper end engaged with the pin 31 while the lower end is engaged with the shaft 20 so that the first arm is always urged to turn clockwise about the pin 20 by the spring 29 thereby to maintain the left brake shoe 24 spaced away from the rim R, as illustrated in FIG. 5.

The second arm 23 also has a connecting section 23a extending to the upper left of the second shaft 21. A cam follower pulley 27 is mounted to the upper end 23c of the section 23a so as to rotate about a pin 32 supported by the upper end 23c. The cam follower 27 is in cooperative contact with a right driver portion 28b of the cam plate 28.

The second arm 23 further has a shoe support section 23b extending downwards from the second fulcrum 21. A right brake shoe 25 is mounted to the free end 23d of the section 23b so as to act upon the rim R for braking.

A second return spring 30 is mounted on the second arm 23, with its upper end engaged with the pin 32 while the lower end is engaged with the shaft 21 so that the second arm is always urged to turn counterclockwise about the shaft 21 by the spring 29 thereby to maintain the right brake shoe 25 spaced away from the rim R, as illustrated in FIG. 5.

The cam driver portions 28a, 28b are so shaped that, when the cable w1 is pulled upwards in the direction of an arrow a, a distance between the pins 31, 32 is forcibly increased so that the first arm 22 turns counterclockwise about the first shaft 20 while the second arm 23 turns clockwise about the second pin 21, whereby the pair of brake shoes 24, 25 are forcibly moved toward each other into braking contact with the rim R as indicated by arrows A in FIG. 5.

On the other hand, when the cable w1 is loosened, the cam driver portions 28a, 28b permit the brake assembly to restore to its normal release position with the aid of the return springs 29, 30 as illustrated in FIG. 5.

The above described structure and arrangement of the center pull type caliper brake assembly are known. The features of the invention reside in the following specfiic construction and arrangement of the assembly.

According to the invention, each of the pair of caliper arms 22, 23 has an auxiliary braking element 33, 34 adapted to automatically act upon the tire surface T at a time of emergency.

The first auxiliary braking element 33 is mounted to the connecting section 22a via a support arm 33a fixed in position to the section 22a by means of a clamp screw 35a. The second auxiliary braking element 34 is mounted to the connection section 23a via a support arm 34a fixed in position to the section 23a by means of a clamp screw 35b.

Each of the braking elements 33, 34 extend in parallel with the tire surface T, as already described in detail in the foregoing.

In operation, when the caliper brake assembly is in its release position, the brake shoes 24, 25 are spaced away from the side walls of the rim R while the auxiliary braking elements 33, 34 are also spaced away from the tire surface T, as shown in solid lines in FIG. 5.

When the brake lever is operated to pull the cable w1 in the direction of the arrow a, the cam plate 23 is pulled up, so that the driver portions, 28a, 28b force the cam followers 26, 27 away from each other. As a result, the first arm 22a is moved counterclockwise about the shaft 20 to bring the left brake shoe 24 into braking contact with the tire surface T, while second arm 23 is moved clockwise about the shaft 21 to bring the right brake shoe 25 into braking contact with the tire surface T as well, as indicated by the arrows A in FIG. 5.

On the other hand, when the cable w1 is loosened in the direction of the arrow b, the arms 22, 23 are urged back in the direction of the arrows B by the return springs 29, 30 to bring the assembly into its release position.

When the cable w1 is completely freed from tension because of an unexpected breakage or disengagement at its one end from the cam plate 28 or at its non-illustrated remote end from the brake lever, the return springs 29, 30 urge the arms 22, 23 to pivotally move about the respective support shaft 20, 21 in the opposite directions as indicated by the arrows B, to the maximum possible extent, with the result that the auxiliary braking elements 33, 34 are brought into braking contact with the tire surface T, as shown in phantom lines in FIG. 5. Thus, automatic braking at emergency can be effected.

The invention being thus described, it will be obvious that the same may be varied in many ways. For instance, the illustrated embodiments are designed for use with a front wheel FW of a bicycle. However, it will be obvious to modify the illustrated embodiments for application to a rear wheel of a bicycle. Further, the support portions 11a, 12a of the auxiliary braking elements 11, 12 or the supports arms 33a, 34a of the auxiliary braking elements 33, 34 may be properly curved and extended so that they can act upon the rim R of a bicycle wheel, if desired. Such variations are not to be regarded as a departure from the spirit and scope of the invention, and all such modifications as would be obvious to those skilled in the art are intended to be included within the scope of the invention.

I claim:

1. A bicycle caliper brake assembly mounted on a bicycle frame for braking a bicycle wheel, said assembly being connected to a remote brake lever via a control cable including at least one cable extending in tension between said caliper brake assembly and said brake lever, said assembly comprising:

a pair of pivotal caliper arms each of which is movable about a support shaft fixed to said bicycle frame, each of said caliper arms having a first section disposed at one side of said support shaft and a second section disposed at another side of said support shaft, a main brake shoe mounted to a free end of said first section of each said caliper arms, a spring means mounted to said caliper arms for urging each said caliper arm away from said bicycle wheel, and an auxiliary brake provided on said second section of each of said caliper arms, said auxiliary brake is spaced away from said bicycle wheel when said cable is tensioned and is automatically urged by said spring means into braking contact with said bicycle wheel when said cable is freed from tension.

2. The brake assembly as defined in claim 1, wherein said auxiliary brake is in the form of an integral projection extending from said second section of each of said caliper arms toward said bicycle wheel.

3. The brake assembly as defined in claim 1, wherein said auxiliary brake includes a brake shoe supported by a support fixed to said second section of each of said caliper arms.

* * * * *